United States Patent
Tynderfeldt et al.

(10) Patent No.: US 10,736,060 B2
(45) Date of Patent: Aug. 4, 2020

(54) TIMING ALIGNMENT IN AN LTE SYSTEM

(71) Applicant: Telefonaktiebolaget LM Ericsson (publ), Stockholm (SE)

(72) Inventors: Tobias Tynderfeldt, Solna (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/284,555

(22) Filed: Feb. 25, 2019

(65) Prior Publication Data

US 2019/0191400 A1 Jun. 20, 2019

Related U.S. Application Data

(63) Continuation of application No. 15/259,689, filed on Sep. 8, 2016, now Pat. No. 10,257,793, which is a
(Continued)

(51) Int. Cl.
*H04W 56/00* (2009.01)
*H04W 74/08* (2009.01)

(52) U.S. Cl.
CPC ... *H04W 56/0005* (2013.01); *H04W 56/0045* (2013.01); *H04W 74/0833* (2013.01); *H04W 74/0841* (2013.01)

(58) Field of Classification Search
CPC . H04W 56/001–0015; H04W 56/0005; H04W 74/0833; H04W 74/0841; H04W 56/0045
See application file for complete search history.

(56) References Cited

U.S. PATENT DOCUMENTS

| | | | |
|---|---|---|---|
| 5,479,409 | A | 12/1995 | Dupuy et al. |
| 6,388,997 | B1 | 5/2002 | Scott |

(Continued)

FOREIGN PATENT DOCUMENTS

| | | |
|---|---|---|
| EP | 0984642 A2 | 3/2000 |
| WO | 01/11907 A1 | 2/2001 |

OTHER PUBLICATIONS

3rd Generation Partenrship Project, "3rd Generation Partnership Project; Technical Specification Group Radio Access Network; Evolved Universal Terrestrial Radio Access (E-UTRA) Medium Access Control (MAC) protocol specification (Release 8)", Technical Specification, 3GPP TS 36.321 V1.0.0, Sep. 1, 2007, pp. 1-18, 3GPP, France.

(Continued)

*Primary Examiner* — Un C Cho
*Assistant Examiner* — Kenan Cehic
(74) *Attorney, Agent, or Firm* — Coats & Bennett, PLLC

(57) ABSTRACT

A method for use in a user terminal in a cellular communications system. According to the method, the user terminal applies a first timing advance value to its transmissions to a controlling node, and the user terminal requests communication with the controlling node in a contention based procedure by transmitting an access request (MSG 1), in response to which the controlling node transmits an initiation message (MSG 2) along with a second timing advance value. According to the method, the user terminal uses the first timing advance value if the user terminal loses the contention based procedure, i.e. if the controlling node subsequently continues the initiated communication with said other user terminal.

8 Claims, 7 Drawing Sheets

Related U.S. Application Data continuation of application No. 14/941,711, filed on Nov. 16, 2015, now Pat. No. 9,468,023, which is a continuation of application No. 12/741,328, filed as application No. PCT/SE2008/050685 on Jun. 9, 2008, now Pat. No. 9,204,468.

(60) Provisional application No. 60/985,379, filed on Nov. 5, 2007.

(56) References Cited

U.S. PATENT DOCUMENTS

| | | | |
|---|---|---|---|
| 6,633,559 B1 | 10/2003 | Raith et al. | |
| 10,187,193 B2* | 1/2019 | Kim | H04W 76/28 |
| 2001/0041575 A1* | 11/2001 | Amirijoo | H04W 64/00 |
| | | | 455/456.5 |
| 2004/0128095 A1* | 7/2004 | Oestreich | H04B 7/2671 |
| | | | 702/89 |
| 2004/0203926 A1* | 10/2004 | Ruutu | H04W 64/00 |
| | | | 455/456.1 |
| 2004/0248575 A1* | 12/2004 | Rajala | H04W 36/0033 |
| | | | 455/436 |
| 2005/0254467 A1 | 11/2005 | Li et al. | |
| 2007/0184865 A1 | 8/2007 | Phan et al. | |
| 2007/0254656 A1 | 11/2007 | Dalsgaard | |
| 2007/0286080 A1 | 12/2007 | Kim et al. | |
| 2008/0075036 A1 | 3/2008 | Bertrand et al. | |
| 2008/0232283 A1 | 9/2008 | Jen | |

OTHER PUBLICATIONS

3rd Generation Partenrship Project, "3rd Generation Partnership Project; Technical Specification Group Radio Access Network; Evolved Universal Terrestrial Radio Access (E-UTRA); Multiplexing and channel coding (Release 8)", Technical Specification, 3GPP TS 36.212 V8.0.0, Sep. 1, 2007, pp. 1-30, 3GPP, France.

LG Electronics, "Omission of Timing Alignment Value in message2", 3GPP TSG-RAN WG2 #59bis, Shanghai, China, Oct. 8, 2007, p. 1, R2-074428, 3GPP.

3rd Generation Partenrship Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300 V8.0.0, Mar. 1, 2007, 3GPP, France.

3rd Generation Partenrship Project, "3rd Generation Partnership Project; Technical Specification Group Radio Access Network; Evolved Universal Terrestrial Radio Access (E-UTRA); Physical channels and modulation (Release 8)", Technical Specification, 3GPP TS 36.211 V8.0.0, Sep. 1, 2007, 3GPP, France.

* cited by examiner

TIMING ALIGNMENT IN AN LTE SYSTEM

This application is a continuation of U.S. application Ser. No. 15/259,689 filed 8 Sep. 2016, which is a continuation of U.S. application Ser. No. 14/941,711 filed 16 Nov. 2015 (now issued as U.S. Pat. No. 9,468,023), which is a continuation of U.S. patent application Ser. No. 12/741,328 filed 4 May 2010 (now issued as U.S. Pat. No. 9,204,468), which is a national stage application of PCT/SE2008/050685, filed 9 Jun. 2008, which claims the benefit of U.S. Provisional Application Ser. No. 60/985,379, filed 5 Nov. 2007, the disclosures of each of which are incorporated herein by reference in their entirety.

TECHNICAL FIELD

The present invention discloses a method for use in a user terminal in a cellular communications system, where the user terminal applies a first timing advance value to its transmissions to a controlling node.

BACKGROUND

In the forthcoming cellular system known as LTE, Long Term Evolution, the downlink transmissions, i.e. transmission to the users in a cell, will use so called OFDM modulation, Orthogonal Frequency Division Multiplex, while the uplink transmissions, i.e. transmission from the users in a cell, will use either OFDM or OFDM-like technologies, such as DFTS-OFDM, a transmission technology which allows for orthogonal multiple access in time as well as in frequency.

Transmissions to and from users in a cell are made to/from a controlling node of the cell, this node in LTE being known as the eNodeB, "evolved NodeS". Users in an LTE system are sometimes referred to as UEs, "User Equipment".

In order to preserve the orthogonality needed in an LTE system, transmissions from the UEs in a cell need to be time aligned when they arrive at the eNodeB, i.e. the transmissions from the UEs in the cell of the eNodeB need to arrive more or less simultaneously at the eNodeB.

Since the different UEs in a cell may be located at different distances from the eNodeB of the cell, the UEs need to initiate their transmissions at different points in time in order for their transmissions to arrive simultaneously at the eNodeB. For example, a UE which is at the cell edge needs to start its transmissions prior to a UE which is closer to the eNodeB.

The issue of when to start the transmissions in the different UEs in a cell can be handled by means of a so called "timing advance", in other words an "offset" value in time at which a UE needs to start its transmissions relative to a nominal transmission time specified by the eNodeB.

The value of the timing advance for a UE can be determined by the eNodeB by means of measuring the arrival of uplink transmissions from the UE, and the eNodeB then transmits the timing advance value to the UE with regular updates, since the UE may move around in the cell.

If a UE does not make any transmissions for a period of time, the timing advance needed by the UE becomes uncertain, for example due to possible movement away from the eNodeB of the UE. In order to avoid unaligned UE transmissions, there is therefore typically in an LTE system a timer in both the eNodeB and the UE, which determines when a UE falls "out of synchronization" in uplink. Thus, if a UE has not received a new timing advance command from its eNodeB during a specified period of time, the UE will consider itself out of synchronization.

A UE which is out of synch and needs to initiate communication with its eNodeB will avail itself of a procedure known as Random Access, a procedure which is used in a number of cases, such as, for example:
  Resynchronization,
  Incoming handover,
  Scheduling request (for a UE that is not allocated any other resource for contacting the base station).
  Initial access, for UEs in the LTE_IDLE or LTE_DETACHED states.

One of the Random Access procedures defined for LTE systems is a so called contention based procedure, and can briefly be described as follows:

The UE starts the Random Access procedure by randomly selecting one of the preambles available for contention-based random access, and then transmits the selected random access preamble on the physical random access channel, PRACH, to the eNodeB.

The eNodeB acknowledges reception of the preamble by transmitting a response, which includes a timing advance value update to be used in future transmissions from the UE.

A problem can arise during the Random Access procedure if more than one UE happens to select one and the same preamble and transmit at the same time, or rather, if the transmissions arrive simultaneously at the eNodeB. In such a case, the eNodeB will resolve the conflict by transmitting a so called contention resolution message, which informs the UEs of which one of them has "won" the contention based procedure, and may thus communicate with the eNodeB.

However, although the contention conflict has been resolved, a problem will remain: the timing advance value update which was transmitted by the eNodeB in response to the preamble is based on the transmission from the "winning" UE, but has been adopted by all of the UEs involved in the "contention conflict". Thus, one or more UEs may have erroneous timing advance values. This is particularly bothersome in the case of a UE which has entered the contention based procedure due to a Scheduling Request, since the UE in that case will have been "in synch" prior to having entered the procedure, but may come out of the procedure "out of synch".

SUMMARY

As has emerged from the explanation above, there is a need for a solution to the problem of timing advance values which will obviate at least some of the problems mentioned above.

Such a solution is offered by the present solution in that it discloses a method for use in a user terminal in a cellular communications system.

In the method of the invention, the user terminal applies a first timing advance value to its transmissions to a controlling node, and the user terminal requests communication with the controlling node in a contention based procedure by transmitting an access request, in response to which the controlling node transmits an initiation message of the requested communication along with a second timing advance value.

According to the method of the invention, the user terminal uses the first timing advance value if the user terminal loses the contention based procedure, i.e. if the controlling node subsequently continues the initiated communication with another user terminal.

Thus, according to the method of the invention, the problem of users who "lose" a contention based procedure such as, for example, a random access procedure, but who during the procedure have received a timing advance intended for the "winner" of the procedure, is solved in that the "original" timing advance value is used if the user terminal loses the procedure.

In one embodiment of the present invention, the user terminal uses the second timing advance value in a message which is subsequent to said initiation message, and in one version of this embodiment, the user terminal uses the second timing advance message if the user terminal wins the contention based procedure.

In another embodiment, the user terminal uses the first timing advance message if the user terminal wins the contention based procedure.

Also, in one version of the invention, the inventive method is applied if the first timing advance value is considered valid by the user terminal, which for example, can be done by means of letting the timing advance value in a user terminal be associated with a timer and be considered valid for the duration of said timer. The timer is suitably started upon reception of a predefined message from the controlling node, so that each of the first and second timing advance values are associated with respective first and second timers which have been started upon reception of respective messages.

In a further version of the "timer embodiments", the user terminal lets the timer which is associated with the first timing advance value continue running after receipt of the message associated with the second timer, and uses the timer value which is associated with the timing advance value which is subsequently used. Thus, which timer that is used is tied to the outcome of the contention based procedure, i.e. if the user "wins" or "loses" the contention based procedure.

In another version of the "timer embodiment", the user terminal saves the value of the timer which is associated with the •first timing advance value when it receives the second timing advance value, and if the controlling node subsequently continues the initiated communication with another user terminal, the user terminal uses a timer value which is the sum of the saved value and the current value of the timer of the second advance value. In other words, the user terminal restarts the timer upon reception of the new timing advance value, but since it knows the value of the "old" timer at the reset point, the user terminal can revert back to the "old" timer by adding the saved value of the "old" timer to the current value of the "new" timer, if the user terminal "loses" the contention based procedure.

These and other advantages and further embodiments will be described in more detail below.

The invention also discloses a user terminal which works according to the inventive method.

BRIEF DESCRIPTION OF THE DRAWINGS

The invention will be described in more detail in the following, with reference to the appended drawings, in which.

DETAILED DESCRIPTION

The invention will in the following be described with the use of terminology from the LTE system, Long Term Evolution. It should however be emphasized that this is done in order to facilitate the reader's understanding, and should not be construed as limiting the scope of protection sought for the present invention, which can be applied to other cellular systems in which the same problems arise. Also, the background will be discussed briefly again in this section of the text.

Figure 1:
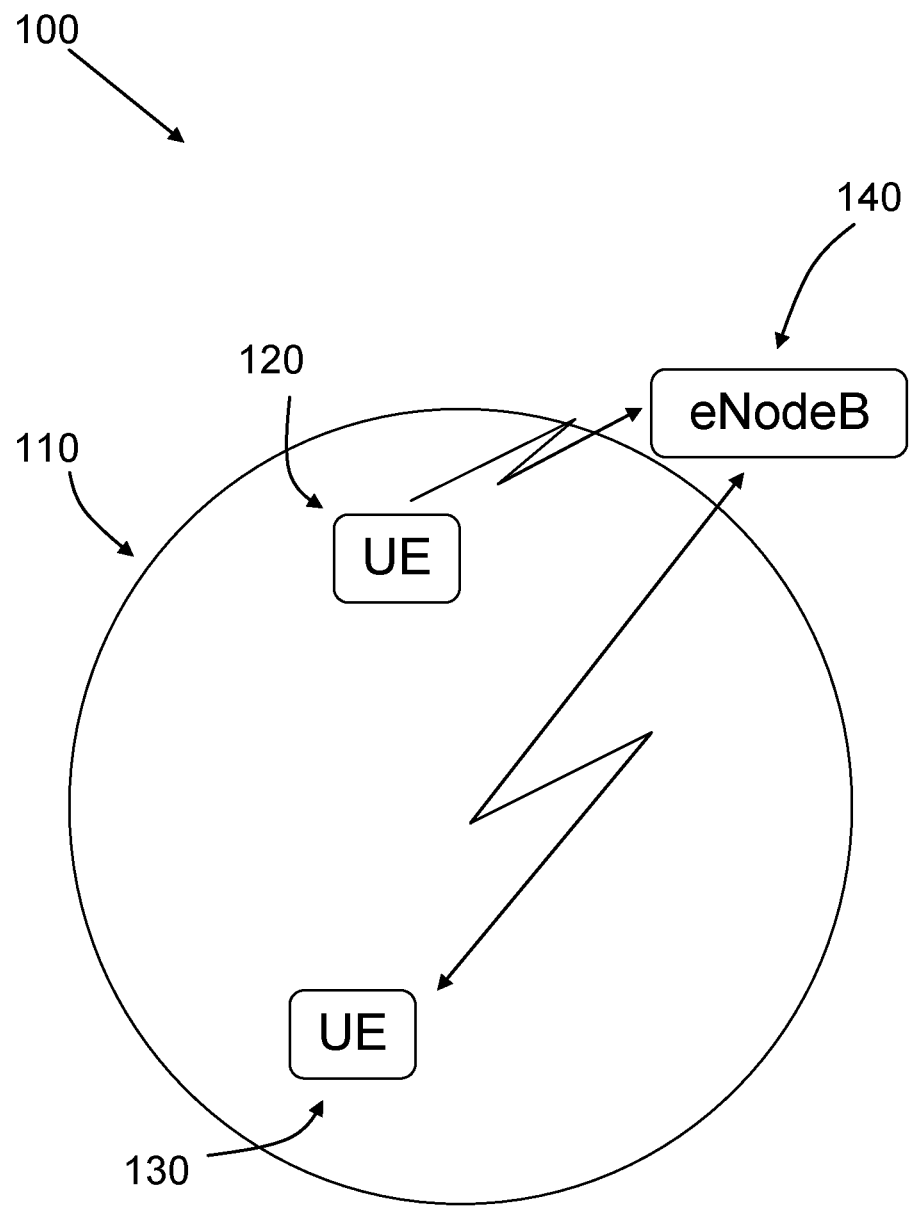
FIG. 1 shows a schematic view of a system in which the invention may be applied.

FIG. 1 shows an overview of a system 100 in which the invention can be applied. As shown, the system 100 comprises a number of cells, one of which is shown as 110 in FIG. 1. Each cell can hold a number of users, two of which are shown in FIG. 1 as 120 and 130. The generic term for users in an LTE system is "UE", User Equipment, a term which will also be used here, and which is used in FIG. 1.

For each cell there is a controlling node, an eNodeB. 140, which controls the traffic to and from the users in the cell. Traffic from the UEs to the eNodeB is known as uplink traffic, UL traffic, and traffic in the other direction is known as downlink traffic, DL traffic.

As explained previously, in an LTE system, it is important for transmissions from the different UEs in a cell to arrive simultaneously at the eNodeB of the cell. The UEs receive instructions from the eNodeB regarding when to make their UL transmissions, but as can be realized, and as can also be seen in FIG. 1, the arrival of an UL transmission at the eNodeB will depend on the distance between the eNodeB and the UE in question. For example, simultaneous transmissions from the UEs 120 and 130 will arrive at the eNodeB 140 at different points in time, with the UL transmissions from the UE 120 arriving before those of the UE 130.

For this reason, the LTE system employs a system of "timing advance" of UL transmissions, so that a UE is informed by the eNodeB of a timing advance value, i.e. an "offset" which should be applied to timing instructions for UL transmissions. The timing advance value for a UE is determined by the eNodeB of the cell by measurements on UL transmissions received from the UE at the eNodeB, and is signalled as a time alignment command.

Figure 2:
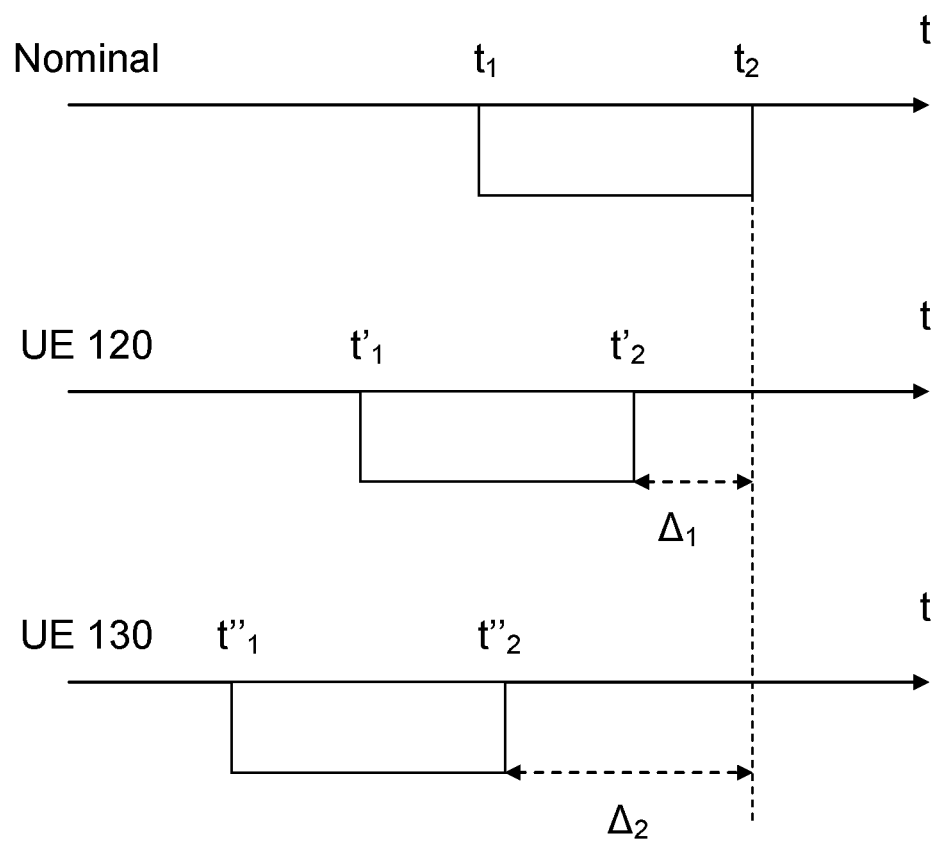
FIGS. 2 and 3 show prior art in order to illustrate a problem.

The notion of timing advance, and of different values for this parameter, is illustrated in FIG. 2, by means of three time lines: the top time line shows a nominal window for UL transmissions from the UEs in the cell 110 to the eNodeB 140. The nominal window extends between $t_1$ and $t_2$. The middle time line shows a timing advance for the UE 120: since the UE 120 is at a certain distance from the eNodeB, the UE 120 needs to make its transmissions between $t'_1$ and $t'_2$ in order for those transmissions to arrive at the eNodeB between $t_1$ and $t_2$. This can also be viewed as displacing the UL transmission window of UE 120 by an offset in time, i.e. a timing advance, with a value of $\Delta_1$ in FIG. 2.

The bottom time line in FIG. 2 shows the timing advance for the UE 130: since the UE 130 is quite far from the eNodeB, the UE 130 needs to make its transmissions between $t''_1$ and $t''_2$ in order for those transmissions to arrive at the eNodeB between $t_1$ and $t_2$. This can also be viewed as displacing the UL transmission window of UE 130 by a timing advance with a value of $\Delta_2$, as shown in FIG. 2.

Figure 3:
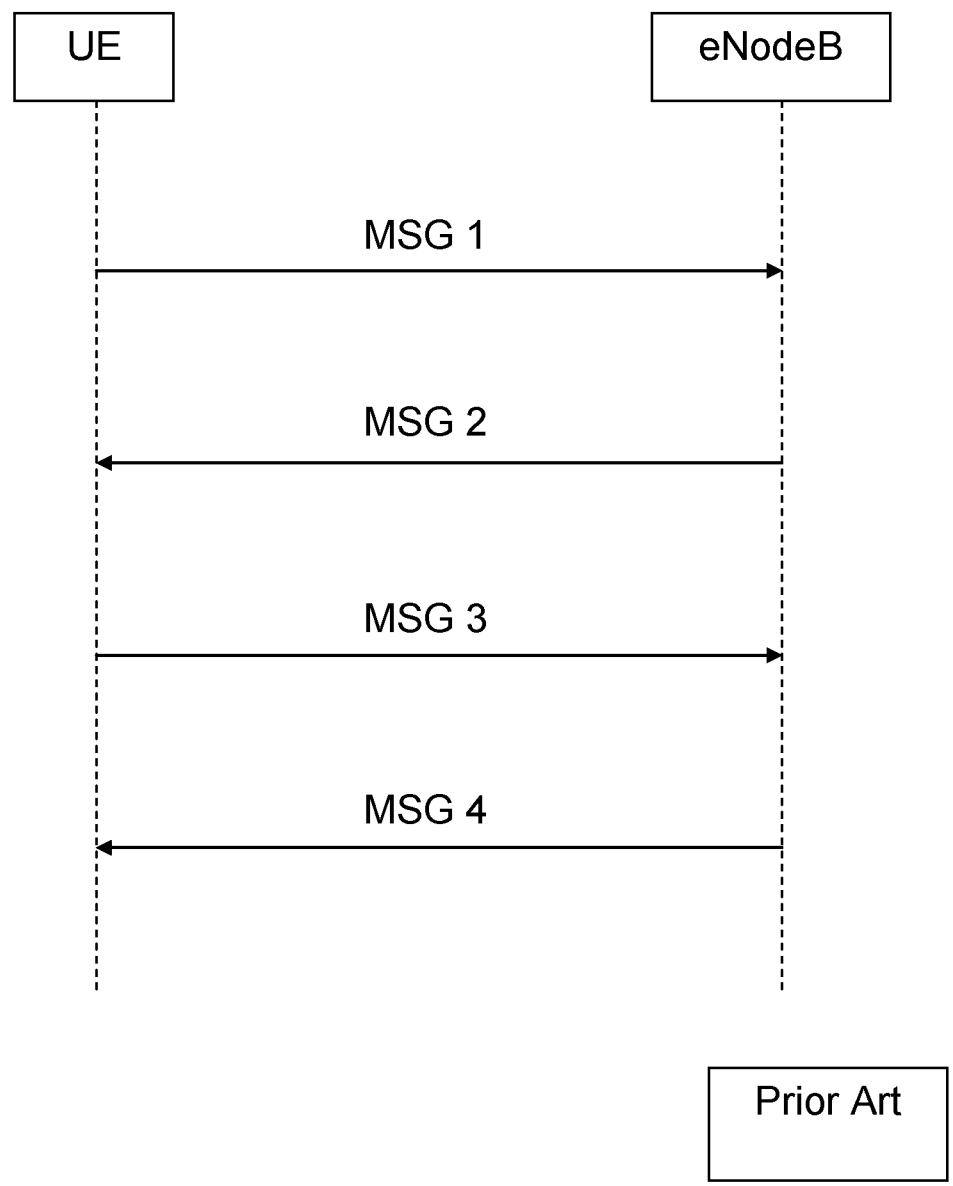

The invention is mainly intended for the contention based Random Access procedure, which is illustrated in FIG. 3, with the messages, "MSG", being numbered as follows:

MSG 1: A random access preamble transmitted by a UE to the eNodeB.

MSG 2: A random access response from the eNodeB, including a timing advance update, based on a measurement of message 1.

MSG 3: A scheduled transmission from the UE, based on the instructions in message 2.

MSG 4: A contention resolution message from the eNodeB, which is transmitted in order to identify the UE which has "won" the contention based procedure.

If there has been a preamble conflict, which is resolved by message 4 as above, the problem which the invention is intended to address can be realized: the timing advance value transmitted by the eNodeB in message 2 is based on message 1 from the "winning" UE, but is applied to all UEs in the conflict. Thus, all UEs in the conflict but one, the winning one, will apply a timing advance value which is erroneous for them.

A basic idea of the invention is that in order to overcome this problem, a UE which requests communication with its eNodeB will use the timing advance value that the UE had prior to requesting communication with the eNodeB if the UE loses the contention based procedure. Thus, if the eNodeB transmits an initiation message with a timing advance value, but then continues the communication with another UE, for example if the UE's request for communication was part of a contention based procedure which the UE loses, the UE will use its "original" timing advance value.

Figure 4:
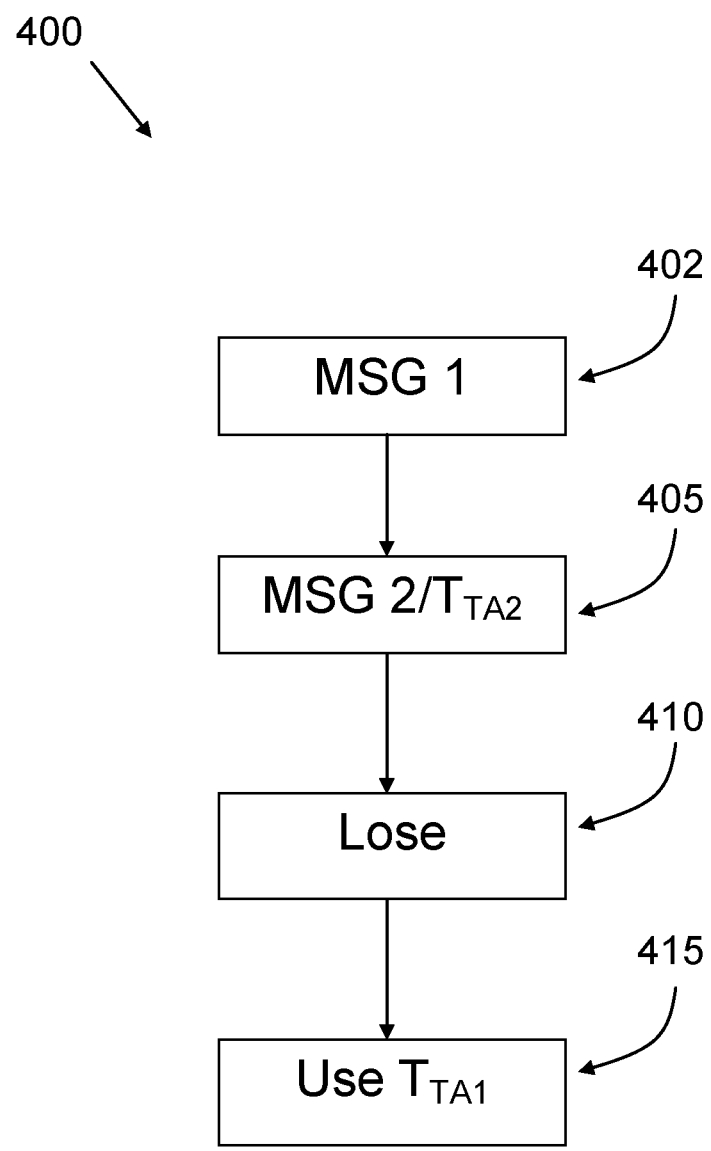
FIGS. 4, 5*a* and 5*b* show flow charts which illustrate the invention.

A flow chart of this basic principle is shown in FIG. 4:

In step 402, the UE requests communication with the eNodeB by means of transmitting MSG 1 of FIG. 3, In step 405, the UE receives message 2, MSG 2, of FIG. 3, with an accompanying timing advance value, $T_{TA2}$, In step 410, the UE loses the contention based procedure, i.e. the controlling node continues the initiated communication with another user terminal, In step 415, the UE uses $T_{TA1}$, in order to transmit messages to the eNodeB.

In one version of the invention, the UE uses the original timing advance value, i.e. $T_{TA1}$ if the UE loses the contention based procedure, but uses the "updated" timing advance value, i.e. $T_{TA2}$, in the subsequent message shown as MSG 3 of FIG. 3. In a further version of this embodiment, the UE will also use $T_{TA2}$ if the UE "wins" the contention based procedure.

In another embodiment of the invention, the UE will use the original timing advance value, i.e. $T_{TA1}$, if the UE "wins" the contention based procedure.

Preferably, the principle shown in FIG. 4 and the versions described above are only applied if the UE has a valid timing advance value when it requests communication with the eNodeB. The notion of a valid timing advance value can preferably be implemented as follows: the timing advance values, e.g. $T_{TA1}$ and $T_{TA2}$, have a validity which is tied to a timer, here referred to as a "timing alignment timer", so that a timing advance value may become invalid due to the fact that the timing alignment timer has expired, i.e. when the timing alignment timer is not running. The timer is started when a specific predetermined message such as, for example, the timing advance value is received from the eNodeB, and, in this case, a reason for the invalidity mentioned above is that the timer has expired. The timer or timers may also be started by predetermined messages during an ongoing "data session" between the NodeB and the UE.

If a timer is used to determine the validity of the timing advance value, there will be a need for one timer for each of the timing advance values shown above, i.e. $T_{TA1}$ and $T_{TA2}$, and these timers will need to be handled in the following manner:

If the UE reverts back to the "old" timing alignment value $T_{TA1}$, a timing alignment timer should be used which reflects the point in time that $T_{TA1}$ was received from the eNodeB.

If the UE successfully completes the random access procedure and uses the new timing alignment value $T_{TA2}$, a timing alignment timer should be used which reflects the point in time when $T_{TA2}$ was received from the eNodeB.

The invention proposes a number of different possibilities in order to correctly manage the timer of the timing advance value in the UE:

One solution is that the UE has two different timers running in parallel during the completion of the contention based procedure, and then selects the appropriate timer, depending on whether or not the procedure is successful, i.e. if the UE "wins" the procedure or not, A second solution is to use a single timing alignment timer, but to take a "snapshot" of the timer when the UE receives $T_{TA2}$, and to then restart the timer. It the procedure is unsuccessful and the UE reverts back to $T_{TA1}$, the UE adds the stored snapshot of the timer to the current value of the timer, A third solution is to use a single timing alignment timer, but to take a "snapshot" of the timer when the UE receives $T_{TA2}$, and then apply a fixed value that reflects the time from reception of $T_{TA2}$ until the procedure either concludes successfully or concludes unsuccessfully due to timeout. This value could either reflect the minimum or maximum latency of the remainder of the RA procedure.

In a fourth version, a UE which already has a valid timing alignment value ignores the timing alignment value received in the random access response message, and transmits subsequent UL messages such as message 3 of FIG. 3 according to that timing value.

Figure 5A:
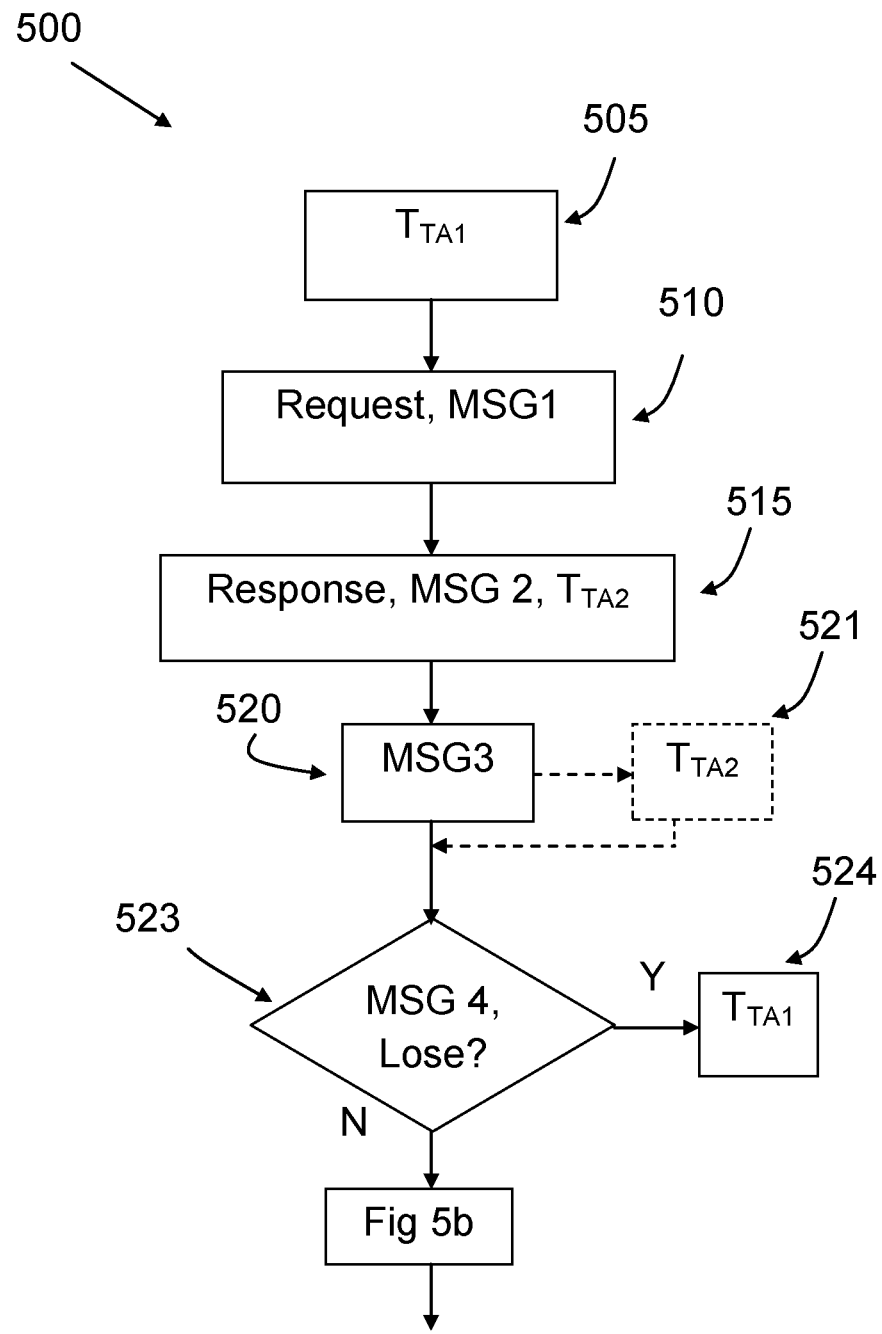
Figure 5B:
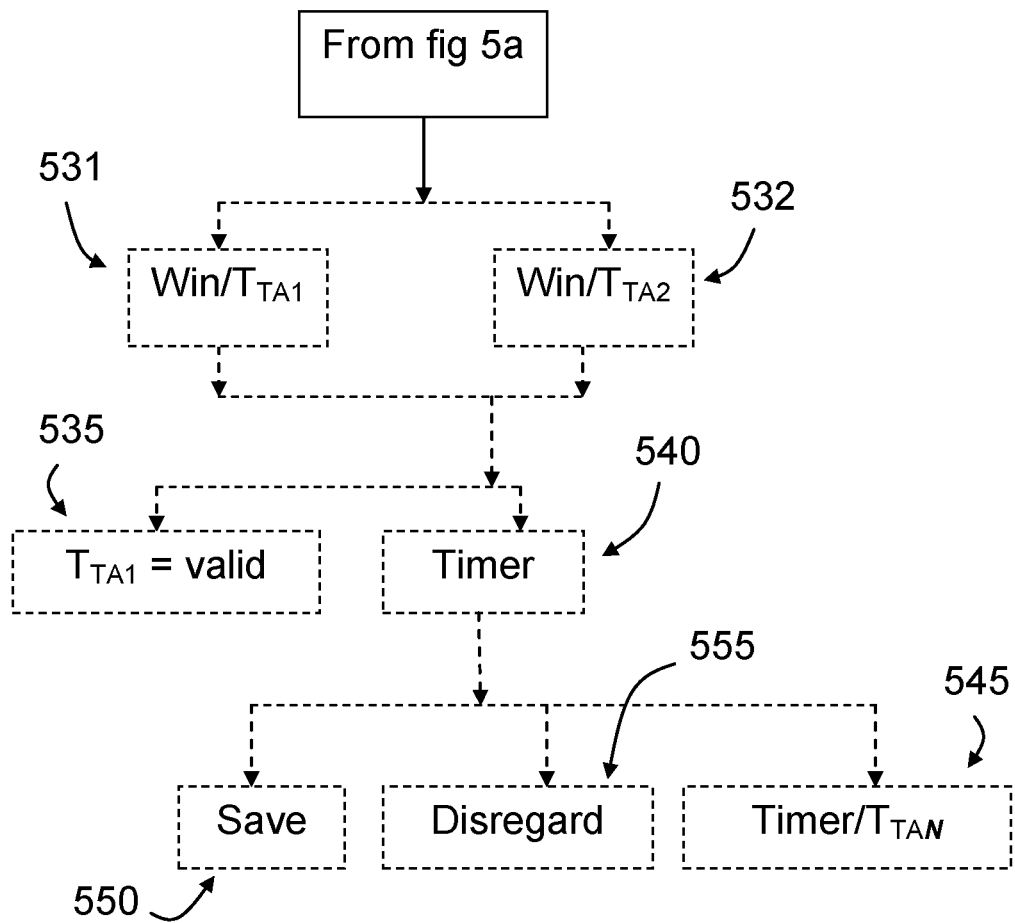

FIG. 5 shows a flow chart of a generalized method of the invention. Steps which are options or alternatives are indicated with dashed lines in FIG. 5.

As has emerged from the description above, the method 500 is intended for use in a user terminal in a cellular communications system, and, as indicated in step 505, according to the inventive method, the user terminal applies a first timing advance value $T_{TA1}$ to its transmissions to a controlling node.

Also, according to the method 500, the user terminal requests, step 510, communication with the controlling node in a contention based procedure by transmitting an access request, such as MSG1 which was shown in FIG. 3, in and as shown in step 515, in response the controlling node transmits an initiation message, such as MSG 2 from FIG. 3, for the requested communication, along with a second timing advance value $T_{TA2}$.

Step 520 shows the message MSG 3 from FIG. 3, i.e. a scheduled transmission from the UE, based on the instructions in MSG 2. As shown in step 521, in one embodiment of the invention, the user terminal uses the second timing advance value in a message which is subsequent to said initiation message, such as MSG 3.

Steps 523 and 524 indicate that the user terminal uses the first timing advance value $T_{TA1}$ if the user terminal loses the contention based procedure, i.e. if the controlling node subsequently continues the initiated communication with another user terminal. The outcome of the contention based procedure is indicated by means of MSG 4, as was also explained in connection with FIG. 3.

Step 531 shows that in an alternative embodiment, the user terminal uses the first timing advance value if the user terminal wins the contention based procedure.

Step 532 shows that in one version of this embodiment, the user terminal uses the second timing advance value if the user terminal wins the contention based procedure.

In one embodiment of the invention, as indicated in step 535, the method of the invention is applied in the case that the first timing advance value is considered valid by the user terminal.

Step 540 indicates that in a further embodiment of the invention, a timing advance value in a user terminal is associated with a timer and is considered valid for the duration of the timer. The timer is started upon reception of a predefined message from the controlling node 140, so that each of the first and second timing advance values are associated with respective first and second timers which have been started upon reception of respective messages.

In the embodiment where a timer is used, the user terminal can, as shown in step 545, let the timer associated with the first timing advance value continue running after receipt of the initiation message associated with the second timer, and then use the timer value associated with the timing advance value ($T_{TAN}$) which is subsequently used.

In another version of the "timer embodiment", as indicated in step 550, the user terminal, upon reception of the second timing advance value, saves the value of the timer which is associated with the first timing advance value. If the controlling node subsequently continues the initiated communication with the other user terminal, the user terminal then uses a timer value which is the sum of the saved value and the current value of the timer of the second advance value.

In a third version of the "timer" embodiment, shown in step 555, a user terminal which has a valid timing alignment value uses this value regardless of receipt of a second timing alignment value.

As has also emerged from the description above, although the invention can be used in any cellular system in which the same problem arises, in a preferred embodiment, the method of the invention is applied in an LTE system, Long Term Evolution, so that the user terminal will be an LTE UE and the controlling node will be an LTE eNodeB. If the method is applied in an LTE system, the procedure in which it is employed is preferably an LTE Random Access procedure.

Figure 6:
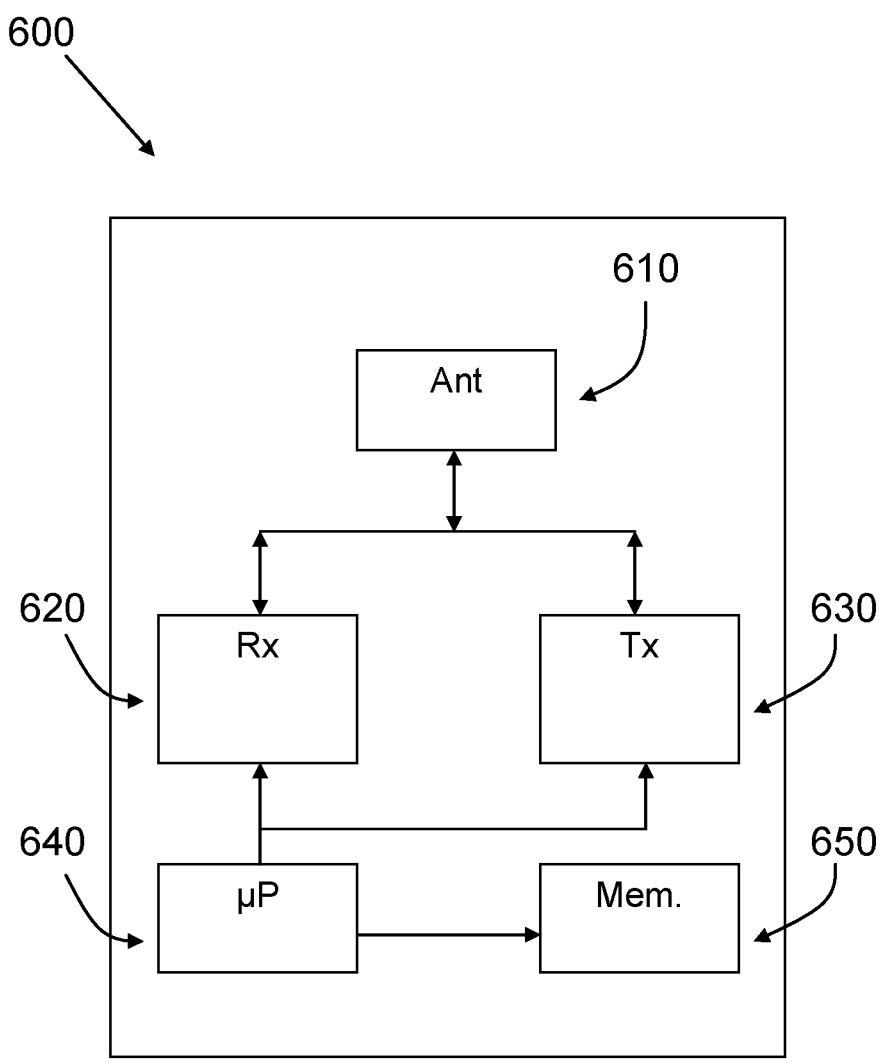
FIG. 6 shows a block diagram of a transceiver of the invention.

FIG. 6 shows a schematic block diagram of a transceiver 600 for use as a user terminal, a UE which functions according to the invention. As indicated in FIG. 6, the transceiver 600 will comprise an antenna, shown as block 610, and will also comprise a receive part 620 and a transmit part 630. In addition, the transceiver 600 also comprises a control means 640 such as a micro processor, as well as a memory 650.

The control means 640 and the memory 650 are used by the transceiver in order to apply a first timing advance value to its transmissions to a controlling node, and the transceiver further comprising means such as the memory 640, the transmit part 630 and the antenna 610 for requesting communication with the controlling node in a contention based procedure by transmitting an access request such as MSG 1.

The transceiver 600 also uses the antenna 610 and the receiver 620 for receiving an initiation message such as MSG 2 in response from the controlling node along with a second timing advance value. In addition, the transceiver 600 uses the control means 640 and the memory 650 for using the first timing advance value if the user terminal loses the contention based procedure, i.e. if the controlling node subsequently continues the initiated communication with another user terminal.

In one embodiment, the transceiver will use the following components for using the second timing advance value in a message such as MSG 3 which is subsequent to said initiation message: the control means 640, the memory 650, the receiver 630 and the antenna 610. In this embodiment, it is also possible for the transceiver 600 to uses the second timing advance message if the contention based procedure is won.

In another embodiment, if the contention based procedure is won, the transceiver 600 uses the following components for applying the first timing advance message if the contention based procedure is won: the control means 640, the memory 650, the receiver 630 and the antenna 610.

In a further embodiment, the transceiver 600 uses the control means 640, the memory 650, the receiver 630 and the antenna 610 for checking if the first timing advance value is considered valid by the user terminal, and in that case, for applying the first timing advance value.

Alternatively, the transceiver 600 may use the control means 640 together with the memory 650 for associating a timing advance value with a timer as well as for considering the timing advance value valid for the duration of said timer, in conjunction with which the antenna 610 and the receive part 620 may be used for starting the timer upon reception of a predefined message from the controlling node, so that each of the first and second timing advance values are associated with respective first and second timers which have been started upon reception of respective messages.

If a timer is used, the control part 640 and the memory 650 may be used for letting the timer which is associated with the first timing advance value continue running after receipt of the message which starts the second timer, as well as for using the timer value that is associated with the timing advance value which is subsequently used.

Alternatively, if a timer is used, the control part 640 and the memory 650 can be used by the transceiver 600 for saving the value of the timer associated with the first timing advance value upon reception of the second timing advance value, as well as for using a timer value which is the sum of the saved value and the current value of the timer of the second advance value, if the controlling node subsequently continues the initiated communication with said other user terminal.

In a further embodiment, the transceiver 600, if it has a valid timing alignment value will use this value regardless of receipt of a second timing alignment value.

Suitably, as has emerged from the text above, the transceiver 600 is suitably a user terminal, a UE, in an LTE system, Long Term Evolution, i.e. it is an LTE UE.

The invention is not limited to the examples of embodiments described above and shown in the drawings, but may be freely varied within the scope of the appended claims.

What is claimed is:
1. A method implemented in a user terminal of a communication system, the method comprising:
    applying a first timing advance value to transmissions to a controlling node;

requesting communication with the controlling node in a contention based procedure by transmitting a random access preamble;

receiving, in response to the transmission of the random access preamble, a random access response along with a second timing advance value from the controlling node; and ignoring the second timing advance value when the first timing advance value is valid and continue applying the first timing advance value to a transmission to the controlling node that is subsequent to the receipt of the random access response;

wherein said first timing advance value is associated with a timer and is valid when the timer is running.

2. The method of claim 1, wherein the user terminal uses the second timing advance value in a message which is subsequent to said random access response.

3. The method of claim 1, wherein the method is applied if the first timing advance value is considered valid by the user terminal.

4. The method of claim 1, wherein the first and second timing advance values in the user terminal are associated with respective first and second timers and are considered valid for the duration of said respective first and second timers, the respective first and second timers being started upon reception of a corresponding predefined message from the controlling node.

5. The method of claim 1, wherein a user terminal which has a valid timing alignment value uses this value regardless of receipt of a second timing alignment value.

6. The method of claim 1, wherein the communication system comprises a Long Term Evolution (LTE) system, and wherein the user terminal comprises an LTE UE and the controlling node comprises an LTE eNodeB.

7. The method of claim 6, wherein the method is applied in an LTE Random Access procedure.

8. A user terminal in a communication system, the user terminal configured to:

apply a first timing advance value to transmissions to a controlling node;

request communication with the controlling node in a contention based procedure by transmitting a random access preamble;

receive, in response to the transmission of the random access preamble, a random access response along with a second timing advance value from the controlling node; and ignore the second timing advance value when the first timing advance value is valid and continue applying the first timing advance value in a transmission to the controlling node that is subsequent to the receipt of the random access response;

wherein said first timing advance value is associated with a timer and is valid when the timer is running.

* * * * *

UNITED STATES PATENT AND TRADEMARK OFFICE
CERTIFICATE OF CORRECTION

PATENT NO. : 10,736,060 B2
APPLICATION NO. : 16/284555
DATED : August 4, 2020
INVENTOR(S) : Tynderfeldt et al.

It is certified that error appears in the above-identified patent and that said Letters Patent is hereby corrected as shown below:

In the Specification

In Column 1, Line 35, delete "NodeS"." and insert -- NodeB". --, therefor.

In Column 4, Line 23, delete "eNodeB." and insert -- eNodeB --, therefor.

In Column 6, Line 28, delete "It the" and insert -- If the --, therefor.

In Column 7, Line 64, delete "memory 640," and insert -- memory 650, --, therefor.

In Column 8, Line 14, delete "receiver 630" and insert -- receiver 620 --, therefor.

In Column 8, Line 22, delete "receiver 630" and insert -- receiver 620 --, therefor.

In Column 8, Line 24, delete "receiver 630" and insert -- receiver 620 --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*